United States Patent
Ferris

(10) Patent No.: US 9,485,117 B2
(45) Date of Patent: Nov. 1, 2016

(54) PROVIDING USER-CONTROLLED RESOURCES FOR CLOUD COMPUTING ENVIRONMENTS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 635 days.

(21) Appl. No.: 12/390,617

(22) Filed: Feb. 23, 2009

(65) Prior Publication Data

US 2010/0217865 A1    Aug. 26, 2010

(51) Int. Cl.
G06F 15/173 (2006.01)
H04L 12/54 (2013.01)
H04L 12/915 (2013.01)

(52) U.S. Cl.
CPC ......... *H04L 12/5695* (2013.01); *H04L 47/785* (2013.01); *H04L 47/787* (2013.01)

(58) Field of Classification Search
USPC ....................................................... 709/226
See application file for complete search history.

(56) References Cited

U.S. PATENT DOCUMENTS

| | | | |
|---|---|---|---|
| 6,463,457 B1 * | 10/2002 | Armentrout et al. | 709/201 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,504,689 B2 | 8/2013 | Ferris et al. | |
| 8,612,615 B2 | 12/2013 | Ferris et al. | |
| 2001/0039497 A1 * | 11/2001 | Hubbard | 705/1 |
| 2002/0069276 A1 | 6/2002 | Hino et al. | |
| 2002/0165819 A1 * | 11/2002 | McKnight et al. | 705/39 |
| 2003/0037258 A1 | 2/2003 | Koren | |
| 2003/0101124 A1 * | 5/2003 | Semret | G06F 9/50 705/37 |
| 2003/0105810 A1 * | 6/2003 | McCrory | H04L 29/06 709/203 |
| 2003/0110252 A1 | 6/2003 | Yang-Huffman | |
| 2003/0135609 A1 | 7/2003 | Carlson et al. | |
| 2003/0177176 A1 | 9/2003 | Hirschfeld et al. | |
| 2004/0010592 A1 * | 1/2004 | Carver | H04L 12/5695 709/226 |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |

(Continued)

OTHER PUBLICATIONS

"rBuilder and the rPath Appliance Platform", 2007 rPath, Inc., www.rpath.com, 3 pages.

(Continued)

*Primary Examiner* — Natisha Cox
(74) *Attorney, Agent, or Firm* — Lowenstein Sandler LLP

(57) ABSTRACT

A cloud management system can be configured to offer a marketplace for user-controlled resources provided by third party users by performing a valuation for user controlled resources offered to the cloud. The cloud management system can be configured to determine the usage of cloud resources, demands on the clouds resources, and revenue generated by the cloud resources and determine a value for user-controlled resources based on the usage, demands, and revenue. Once the value is determined, the cloud management system can be configured to provide an indication of the value to a set of the third party users. If offered and accepted, the cloud management system can be granted access to the user-controlled resources and allocate the user-controlled resources to the cloud.

21 Claims, 5 Drawing Sheets

(56) References Cited

U.S. PATENT DOCUMENTS

| | | |
|---|---|---|
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1* | 10/2006 | Matsumoto et al. ............ 705/10 |
| 2007/0011052 A1* | 1/2007 | Liu et al. ........................ 705/20 |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1* | 4/2008 | Meijer .................... H04L 12/66 370/254 |
| 2008/0080552 A1* | 4/2008 | Gates ..................... H04L 12/66 370/468 |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0201253 A1* | 8/2008 | Gray et al. ....................... 705/37 |
| 2008/0201459 A1* | 8/2008 | Vul et al. ....................... 709/223 |
| 2008/0215796 A1 | 9/2008 | Lam et al. |
| 2008/0240150 A1 | 10/2008 | Dias et al. |
| 2008/0313642 A1* | 12/2008 | Karaoguz ............. G06F 9/5027 718/104 |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0119673 A1* | 5/2009 | Bubba .................... G06F 9/50 718/104 |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057133 A1 | 3/2010 | Simon |
| 2010/0057831 A1 | 3/2010 | Williamson |
| 2010/0058347 A1 | 3/2010 | Smith et al. |
| 2010/0088205 A1* | 4/2010 | Robertson ............. G06Q 20/102 705/34 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0174782 A1* | 7/2010 | Rose ............................ 709/204 |
| 2010/0217865 A1 | 8/2010 | Ferris |
| 2010/0220622 A1 | 9/2010 | Wei |
| 2010/0299366 A1 | 11/2010 | Stienhans et al. |
| 2011/0004574 A1 | 1/2011 | Jeong et al. |
| 2011/0004916 A1 | 1/2011 | Schiffman et al. |
| 2011/0016214 A1 | 1/2011 | Jackson |
| 2011/0055398 A1 | 3/2011 | Dehaan et al. |
| 2011/0131335 A1 | 6/2011 | Spaltro et al. |
| 2011/0313902 A1 | 12/2011 | Liu et al. |
| 2011/0320606 A1 | 12/2011 | Madduri et al. |
| 2012/0265884 A1 | 10/2012 | Zhang et al. |

OTHER PUBLICATIONS

White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
DeHaan, "Methods and Systems for Abstracting Cloud Management", U.S. Appl. No. 12/474,113, filed May 28, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
Ferris, "Methods and Systems for Providing a Universal Marketplace for Resources for Delivery to a Cloud Computing Environment", U.S. Appl. No. 12/475,228 filed, May 29, 2009.
DeHaan et al., "Systems and Methods for Power Management in Managed Network Having Hardware-Based and Virtual Reources", U.S. Appl. No. 12/475,448, filed May 29, 2009.
DeHaan et al., "Methods and Systems for Flexible Cloud Management with Power Management Support", U.S. Appl. No. 12/473,987, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan, "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris, "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.

(56) References Cited

OTHER PUBLICATIONS

Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris at al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris et al., "Systems and Methods for Combinatorial Optimization of Multiple Resources Across a Set of Cloud-Based Networks", U.S. Appl. No. 12/953,713, filed Nov. 24, 2010.

Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Detecting Resource Consumption Events Over Sliding Intervals in Cloud-Based Network", U.S. Appl. No. 13/149,235, filed May 31, 2011.
Morgan. "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
Non-Final Office Action mailed on Dec. 8, 2015, on U.S. Appl. No. 13/942,268.
Notice of Allowance mailed on Apr. 1, 2013, on U.S. Appl. No. 12/790,366.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Period", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

PROVIDING USER-CONTROLLED RESOURCES FOR CLOUD COMPUTING ENVIRONMENTS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

In application specific computing environments, individual users may be able to add their particular computing resources to assist in performing computing processes. For example, the Search for Extraterrestrial Intelligence (SETI) program allows individual users to contribute the processing power of their personal systems for performing mathematical computations on experimental data. In these application specific computing environments, the user does not have an ability to track or receive any compensation of the computing power provided.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
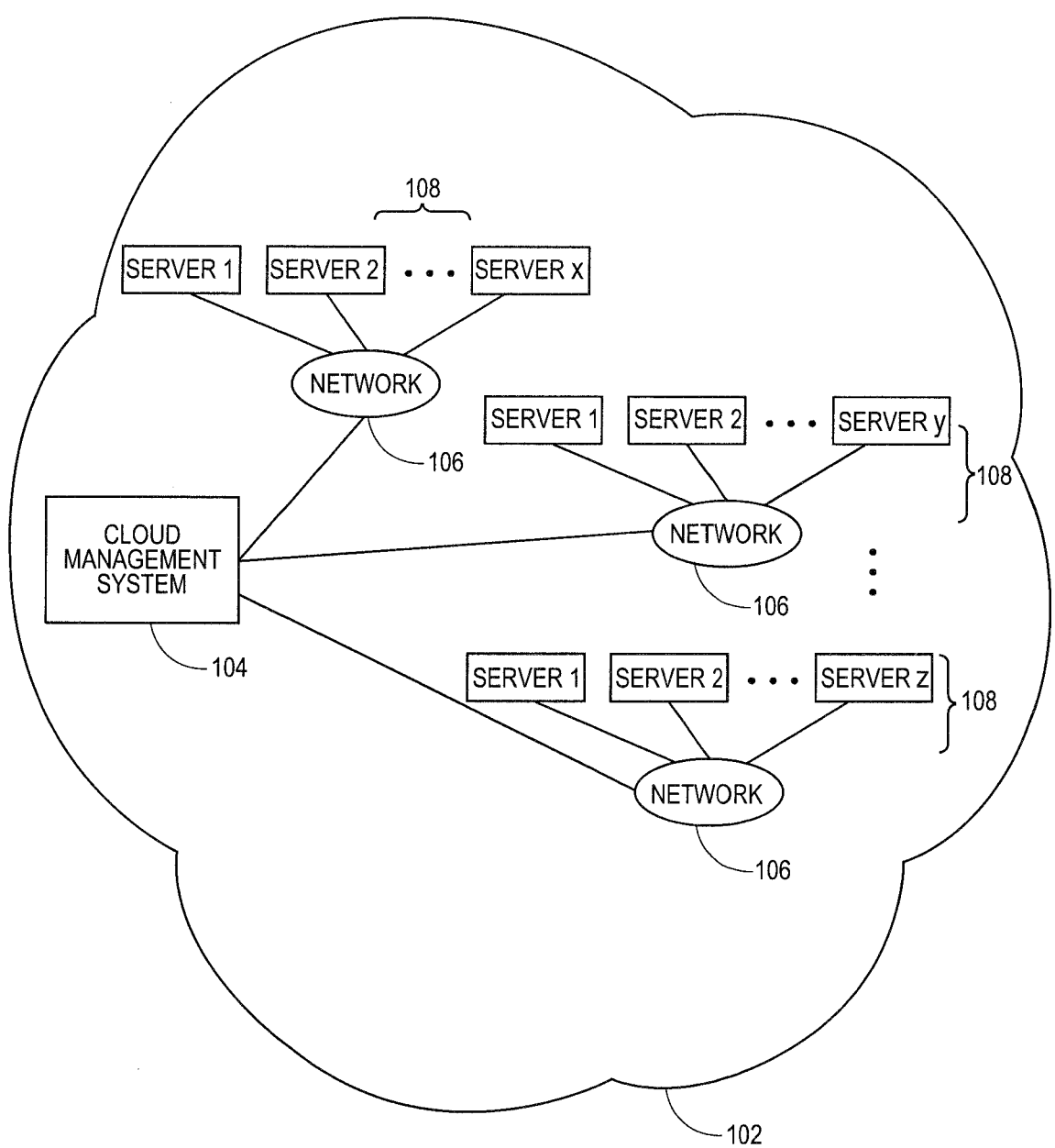
FIG. 1 illustrates an overall cloud system architecture in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for extending cloud resources to third party resources. More particularly, embodiments relate to platforms and techniques in which a cloud computing environment can offer a marketplace for leasing the third party resources.

According to embodiments, a cloud management system can be configured to offer a marketplace for user-controlled resources provided by third parties by performing a valuation on user-controlled resources offered to the cloud. The cloud management system can be configured to determine the usage of cloud resources, demands on the clouds resources, and revenue generated by the cloud resources and determine a value for user-controlled resources based on the usage, demands, and revenue. Once the value is determined, the cloud management system can be configured to provide an indication of the value to a set of the third party users for purchase or resale to the cloud.

According to embodiments, once the resources are valued and the value is made available to third party users, the cloud management system can be configured to receive requests to provide user-controlled resources to the cloud from the third party users. The cloud management system can be configured to apply the determined value to the particular user-controlled resources offered and provide service level agreements for access to the user-controlled resources based on the valuation. If accepted, the cloud management system can be granted access to the user-controlled resources and allocate the user-controlled resources to the cloud.

According to embodiments, the cloud management system can be configured to re-value additional user-controlled resources provided to the cloud as the user-controlled resources are allocated to the cloud. Likewise, the cloud management system can be configured to offer new service level agreements to the third party users already providing user-controlled resources based on the usage of and demands on the cloud.

By offering value for specific resources contributed to the cloud, an operator of a cloud computing environment can provide incentive to third party users for contributing resources to the environment. Additionally, by tying the grant of access to a service agreement, the operator of the cloud computing environment can enhance the reliability of the third party resources. As such, the operator can enhance the flexibility, power, and reliability of the cloud environment without committing dedicated resources to the cloud.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
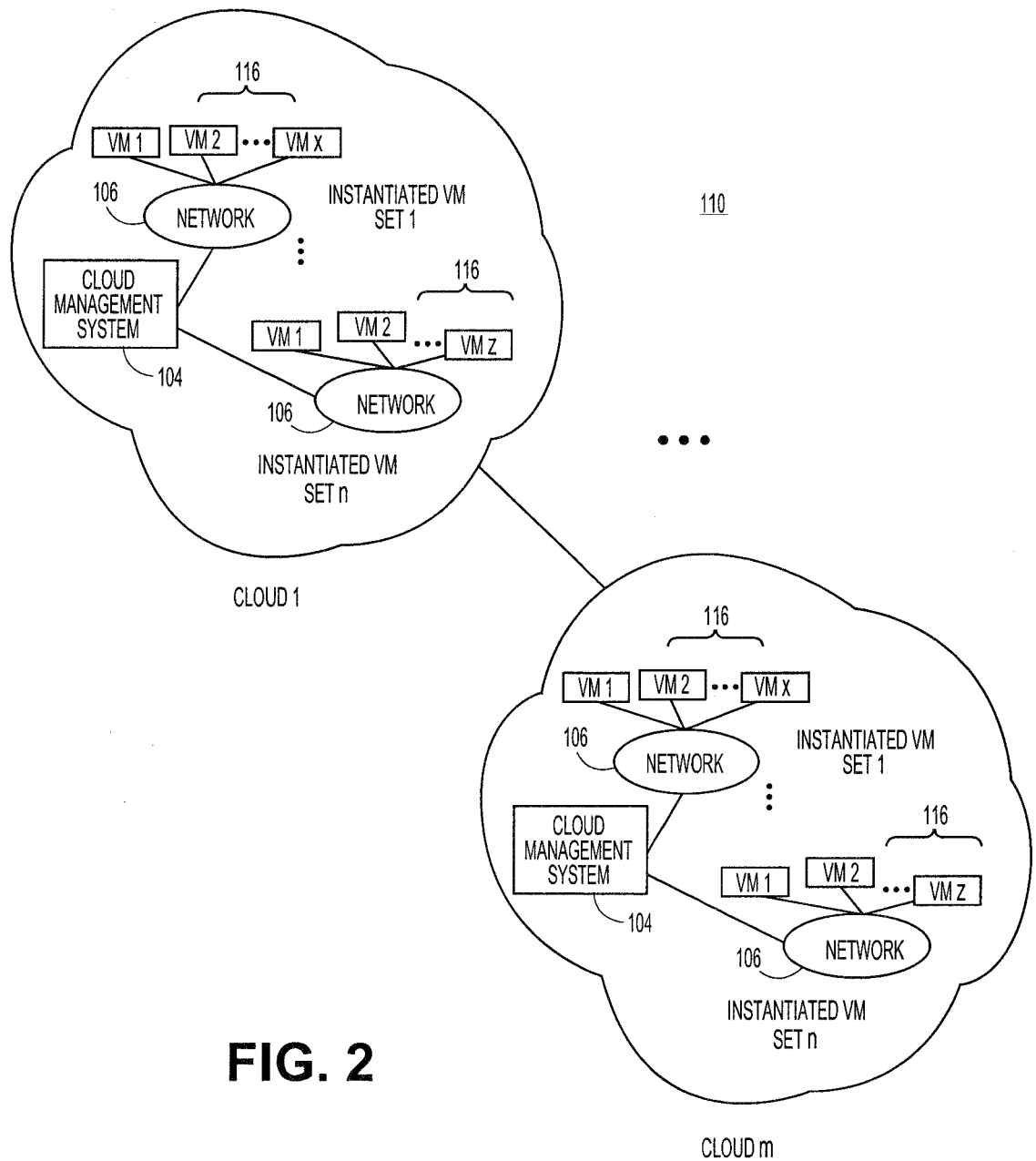
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other subcomponents which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
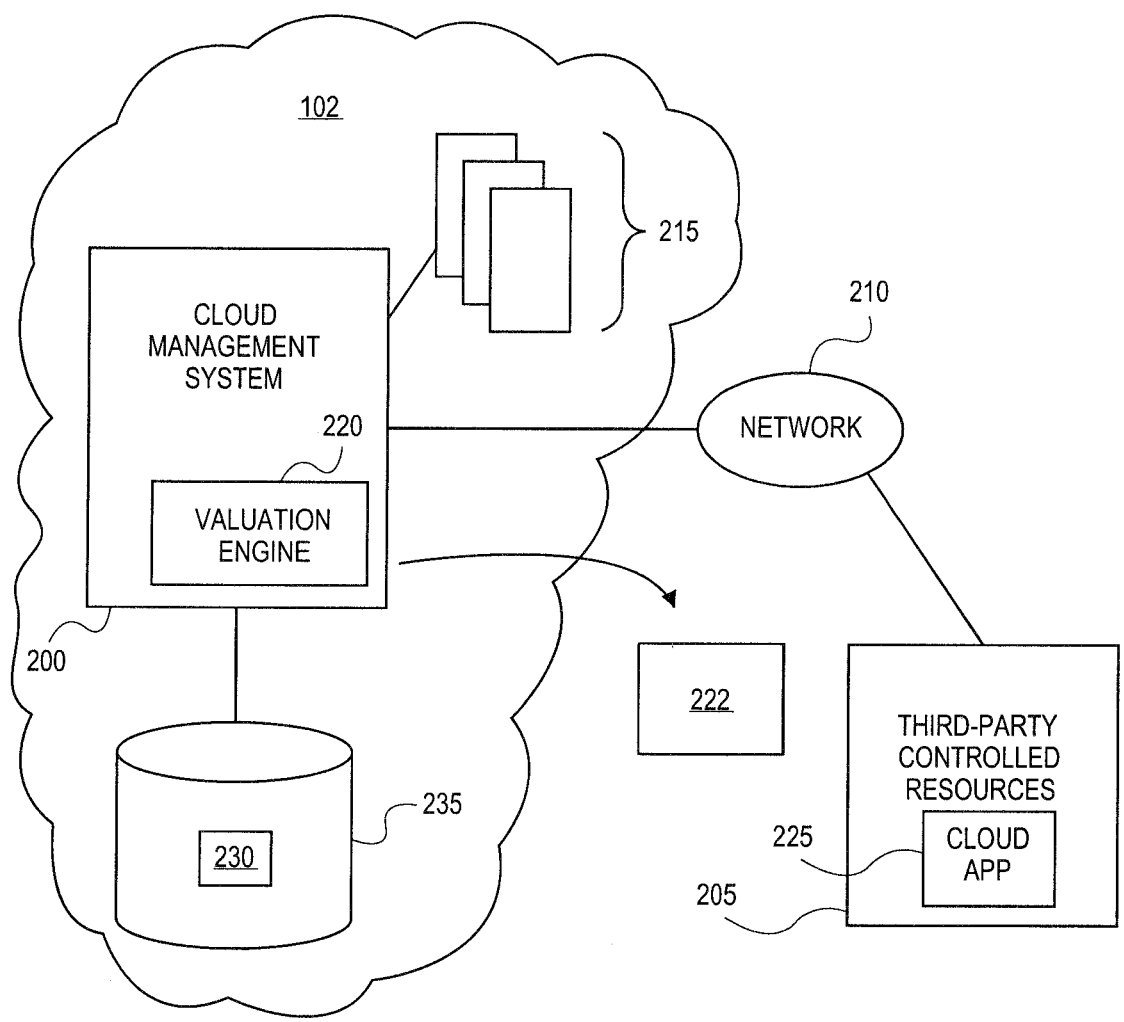
FIG. 3 illustrates an overall cloud system architecture in which user-controlled resources can be valued and utilized as cloud resources, according to various embodiments.

FIG. 3 illustrates aspects of the cloud 102 which can generate a marketplace for user-controlled resources provided to the cloud 102, according to various embodiments. In embodiments, a cloud management system 200 can be configured to communicate with one or more third party user-controlled resources 205 via network 210 to deliver cloud based resources.

In embodiments, the cloud 102 can include a pool of resources 215 under the control of the cloud management system 200 as described above in FIGS. 1 and 2. Based on the usage or expected usage of the cloud 102, the cloud management system 200 can be required to add additional resources to the pool of resources 215 in order to meet the demands placed on the cloud 102. For example, the cloud 102 can be near 100% utilization of the pool of resources 215 based on the current processes instantiated in the cloud, or, likewise, based on current demand, the cloud management system 200 can expect increased utilization of the pool of resources 215 at a future point. Additionally, the cloud management system 200 can desire to increase the pool of resources 215 for any reason, such as increasing revenue generated by the cloud. As such, the cloud management system 200 may need to add additional resources to the pool of resources 215. Typically, the pool of resources 215 can be increased by adding fixed and dedicated resources to the pool of resources 215.

In embodiments, the cloud management system 200 can desire to leverage third party resources, such as third party user-controlled resources 205, in order to increase the resources offered by the cloud 102. In embodiments, the user-controlled resources 205 can be any type of computer system under the control of a user, independent of the owner or operator of the cloud 102. For example, the user-controlled resources 205 can be one or more personal computers (desktop, laptop, etc.), one or more server computers, and the like, which are under the control of individuals, companies, and the like. The user-controlled resources 205 can include hardware resources, such as processors, memory, network hardware and bandwidth, storage devices, and the like, and software resources, such as operating systems (OS), application programs, and the like. The third party user of the user-controlled resources 205 can desire to make the user-controlled resources 200 available to the cloud 102. As such, the cloud management system 104 can utilize the user-controlled resources 205 in the pool of resources 215 of the cloud 102 to host applications, appliances, virtual machines, and the like.

In embodiments, in order to foster the inclusion of third party user-controlled resources, the cloud management system 200 can be configured to offer value for user-controlled resources provided to the cloud 102. In embodiments, to achieve this, the cloud management system 200 can be configured to include a valuation engine 220. The valuation engine 220 can be configured to determine a value for user-controlled resources from third party users. The valuation engine 220 can be configured to determine the value for user-controlled resources based on a number of factors such as usage of the pool of resources 215, estimated demand on the pool of resources 215, revenue generated by the pool of resources 215, and the like.

In embodiments, the valuation engine 220 can be configured to determine the current usage of the pool of resources in order to value the user-controlled resources based on need. The valuation engine 220 can be configured to examine the pool of resources 215 to determine the current usage. For example, the valuation engine 220 can determine the amount of the pool of resources 215 that are currently used and the amount of the pool of resources 215 that are available. For example, the valuation engine 220 can examine the processes instantiated on the pool of resources 215 and determine a percent utilization, such as 50%, 60%, etc. The amount can include the current usage of particular resources such as the amount of memory utilized, the amount of computing power (processing cycles) utilized, the amount of communication bandwidth utilized, the amount of storage utilized, the amount of software resources utilized (OS utilization, specific application utilization, etc.), and the like.

In embodiments, once the valuation engine 220 determines current usage, the valuation engine 220 can be configured to determine estimated demand for the pool of resources 215 in the future. The valuation engine 220 can be configured to determine the estimated demand based on an expected usage of the pool of resources 215. For example, the valuation engine 220 can determine that each month for the past year the cloud 102 increased utilization of the pool of resources 215 by 2%. Based on this, the valuation engine 220 can determine that the cloud 102 may need an increase in resources of at least 2% each month. One skilled in the art will realize that the valuation engine 220 can be configured to utilize any type of statistical method or algorithm to determine estimated demand. Additionally, the valuation engine 220 can be configured to determine the estimated demand for each specific resource such as the estimated amount of memory, the estimated amount of computing power, the estimated amount of communication bandwidth, the estimated amount of storage, the estimated amount of software resources utilized, and the like.

In embodiments, the valuation engine 220 can be configured to determine the revenue received for usage of the cloud 102 and/or an expected revenue received for usage of the cloud 102. For example, the valuation engine 220 can determine the revenue received as a percentage of the usage of the pool of resources 215 based on past revenue. Additionally, the valuation engine 220 can be configured to determine the revenue for each specific resource such as the revenue per amount of memory, the revenue per amount of computing power, the revenue per amount of communication bandwidth, the revenue per amount of storage, the revenue per amount of software resources utilized, and the like.

In embodiments, once the usage, estimated demand, and revenue are determined, the valuation engine 220 can be configured to determine the value of the user-controlled resources provided to the cloud based on one or more of the usage, estimated demand, and revenue. Based of this, the valuation engine 220 can determine the value of user-controlled resources provided to the cloud in order to meet the demand on the cloud 102 and generate positive revenue for the cloud 102. For example, the valuation engine 220 can determine that the pool of resources 215 is 90% utilized, that the cloud usage will increase each month by 2%, and that each 1% of cloud 102 utilization generates $100 of revenue. Based on this, the valuation engine 220 can value each 1% of the user-controlled resources provided at, for example, $20 in order to generate positive revenue.

In embodiments, additionally, the valuation engine 220 can be configured to account for necessity when determining the value of the user-controlled resources. For example, the valuation engine 220 can determine that the pool of resources 215 is 40% utilized, that the cloud usage will increase each month by 2%, and that each 1% of the cloud usage generates $100 of revenue. Based on the under utilization of the pool of resources 215, the valuation engine 220 can value each 1% of the user-controlled resources provided at, for example, $1.

In embodiments, the valuation engine 220 can be configured to determine the value for each specific resource such as the value for an amount of memory, the value for an amount of computing power, the value for an amount of communication bandwidth, the value for an amount of storage, the value for an amount of software resources, and the like.

In embodiments, additionally, the valuation engine 220 can be configured to account for the duration of the user-controlled resources provided when determining the value of the user-controlled resources. For example, the valuation engine 220 can determine a higher value for the user-controlled resources that are provided for a longer duration and visa versa.

In embodiments as described above, the valuation engine 220 can be configured to utilize certain factors such as current usage, estimated demand, revenue generated, and duration when determining a value for user-controlled resources. One skilled in the art will realize that the valuation engine 220 can utilize any number of factors in determining a value for the resources provide to the cloud. For example, the valuation engine 220 can utilize such factors as cost of adding dedicated resources to the pool of resources 215, the availability of third party resources, the value placed on third party resources by other clouds, previous determined value of third party resources, the replacement cost of the third party resources, and the like.

In embodiments, once the value of the user-controlled resources is determined, the valuation engine 220 can be configured to provide an indication 222 of the value of the user-controlled resources to be provided to the cloud 102 to third party users, such as a third party user-controlled resources 205 via network 210. The valuation engine 220 can be configured to provide the indication 222 utilizing any type of communication, such as email, web page, text message, and the like. For example, the valuation engine 220 can be configured to generate and populate a web site with the value for different resources provide to the cloud 102. As such, the valuation engine 220 can contain the necessary logic to generate graphical user interfaces (GUIs), e.g. dialog boxes and web pages, or contain the necessary logic to utilize other programs or applications to communicate with third party users.

In embodiments, once the indication 222 is provided to third party users, the third party users can offer to provide a portion of the user-controlled resources, such as the user-controlled resources 205, to the cloud 102. The cloud management system 200 can be configured to receive a request to offer the user-controlled resources 205 via the network 210. The cloud management system 200 can be configured to receive the request utilizing any type of communication, such as email, web page, text message, and the like. For example, if a web page is utilized, the valuation engine 220 can be configured to generate and populate the web site with forms and fields that allow the third party user to submit the request to the cloud management system 200.

In embodiments, the request to offer the user-controlled resources 205 can include the specifications of the particular user-controlled resources 205 provided and the duration for the resources to be provided. For example, the request can include an amount of memory to allocate to the cloud, an amount of computing cycles to allocate to the cloud, an amount of communications bandwidth to allocate to the cloud, an amount of storage to allocate to the cloud, software resources to allocate to the cloud, and the like.

In embodiments, once the request is received, the valuation engine 220 can be configured to determine the particular value of the user-controlled resources 205 offered. The valuation engine 220 can be configured to apply the previously determined value to the specifications of the offered user-controlled resources 205. For example, if the user-controlled resources 205 represent 1% of the pool of resources 215, offered for two months and the value is $20, per 1%, per month, the valuation engine 220 can determine that the particular value of the offered user-controlled resources 205 is $20 per month or $40 for two months total.

In embodiments, once the particular value of the offered user-controlled resources 205 is determined, the cloud management system 200 can be configured to return the particular value to the user-controlled resources 205 as a service level agreement for the offered user-controlled resources 205. If accepted, the cloud management system 200 can allocate the offered user-controlled resources 205 to the pool of resources 215.

In embodiments, to make the offered user-controlled resources 205 available for allocation, the user-controlled resources 205 can include a cloud application 225. The cloud application 225 can be configured to allow the user to make a set of the resources of the user-controlled resources 205 available to the cloud management system 200. The cloud application 225 can be configured to allow the cloud management system 200 to request resources from the set of resources. In response to requests, the cloud application 225 can be configured to provide access to the set of resources for use by the cloud management system 200.

In embodiments, the cloud application 225 can be configured to contain necessary logic for identifying and providing accesses to a set of resources of the user-controlled resources 205 and for communicating with the cloud management system 200. For example, the cloud application 225 can be configured to contain logic for communicating with the hardware resources of the user-controlled resources 205 (e.g. processor, memory, storage devices, communications interfaces, etc.) and software resources of the user-controlled resources 205 (operating systems, application programs, etc.). For example, the cloud application 225 can be configured to communicate with the OS to identify and allocate resources accessible by the cloud management system 200. Additionally, the cloud application 225 can be configured to allow the user to specify a particular set of resources accessible by the cloud management system 200, such as the offered user-controlled resources 205.

In embodiments, the cloud application 225 can be configured to grant access to the set of resources. For example, the cloud application 225 can be configured to communicate with the hardware and software resources to grant direct access to the set of resources to the cloud management system 200 for instance, via TCP/IP, FTP or other protocols or channels. Likewise, the cloud application 225 can be configured to receive the processes to be performed on the user-controlled resources 205 and to instantiate the processes on the set of resources.

In embodiments, the cloud application 225 can be configured to provide secure communications between the cloud application 225 and the cloud management system 200. The cloud application 225 can be configured to include the necessary logic to perform any known security protocols between the user-controlled resources 205 and the cloud management system 200. For example, the cloud application 225 can be configured to perform authentication (secure login, passwords checks, digital signatures authentication, digital certificate authentication, etc), communication encryption (symmetric cryptography, asymmetric cryptography, etc.), and the like.

Likewise, the cloud management system 200 can be configured to contain logic to directly access, control, and allocate the hardware and software resources of the user-controlled resources 205 as described above.

In embodiments, the cloud management system 200, utilizing the valuation engine 220, can be configured to determine a new value of the user-controlled resources periodically or upon occurrence of events such as dedicated resources being added to the pool of resources 215, user-controlled resources being added to the pool of resources 215, and/or a change in the factors used to determine the value. Likewise, the cloud management system 200 can be configured to update or provide a new indication 222 as the new values are determined.

In embodiments, the cloud management system 200 can be configured to offer new service level agreements to the third party users already providing user-controlled resources based on a change in the factors used to determine the value. For example, the cloud management system 200 can be configured to offer a new service level agreement for additional resources to the user-controlled resources 205 if demand on the pool of resources 215 increases.

In embodiments, the cloud management system 200 can be configured to maintain a record 230 of the value for the user-controlled resources and any user-controlled resources allocated to the pool of resources 215. The record 230 can include a list of determined values for the various types of resources and a list of user-controlled resources, such as the user-controlled resources 205, allocated, the particular value for those resources, and specifications of those resources. The cloud management system 200 can be configured to maintain the record 230 in a repository 235.

In embodiments as described above, the cloud management system 200 can provide the indication 222 directly to the third party users. Additionally, the cloud management system can be configured to provide the values placed the user-controlled resources to an independent marketplace for user-controlled resources via the network 210. The independent marketplace can be a centralized market for user-controlled resources from various clouds. The cloud management system 200 can be configured to provide the indication 222 and the request to provide the resources via the independent marketplace.

Figure 4:
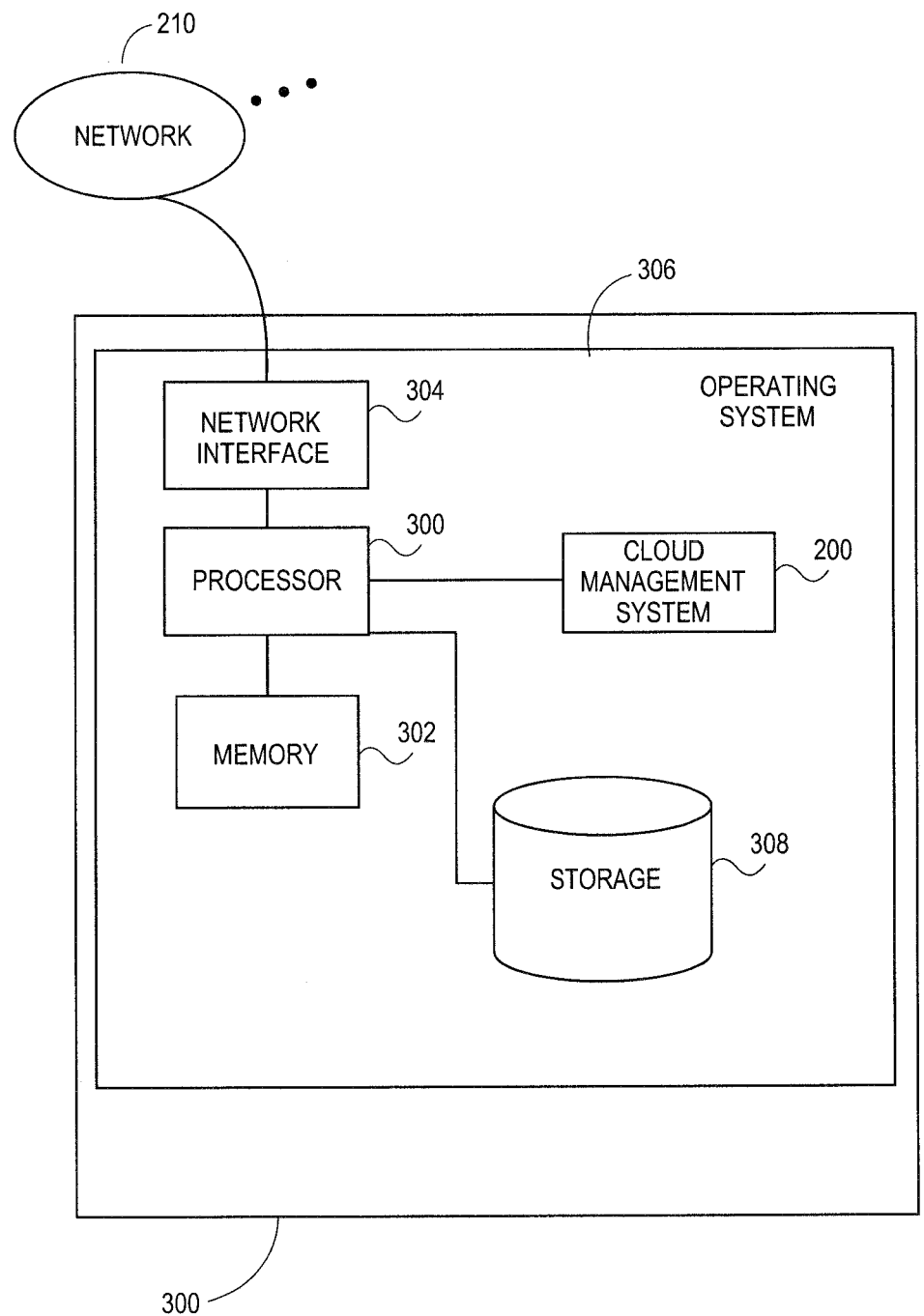
FIG. 4 illustrates an exemplary hardware configuration for the cloud management system, according to various embodiments.

FIG. 4 illustrates an exemplary diagram of hardware and other resources that can be incorporated in a computing system 300 and configured to communicate with the user-controlled resources 205 via one or more networks 210, according to embodiments. In embodiments as shown, the computing system 300 can comprise a processor 300 communicating with memory 302, such as electronic random access memory, operating under control of or in conjunction with operating system 306. Operating system 306 can be, for example, a distribution of the Linux™ operating system, such as SELinux, the Unix™ operating system, or other open-source or proprietary operating system or platform. Processor 300 also communicates with one or more storage device 308, such as hard drives, optical storage, and the like, for maintaining the repository 235 and the record 230 Processor 300 further communicates with network interface 304, such as an Ethernet or wireless data connection, which in turn communicates with one or more networks 210 such as the Internet or other public or private networks.

Processor 300 also communicates with the cloud management system 200, to execute control logic and allow for valuation and allocation of the user-controlled resources as described above and below. Other configurations of the computing system 300, associated network connections, and other hardware and software resources are possible.

While FIG. 4 illustrates the computing system 300 as a standalone system including a combination of hardware and software, the computing system 300 can include multiple systems operating in cooperation. The cloud management system 200, including the valuation module 220, can be implemented as a software application or program capable of being executed by the computing system 300, as illustrated, or other conventional computer platforms. Likewise, the cloud management system 200, including the valuation module 220, can also be implemented as a software module or program module capable of being incorporated in other software applications and programs. In either case, the cloud management system 200, including the valuation module 220, can be implemented in any type of conventional proprietary or open-source computer language.

Figure 5:
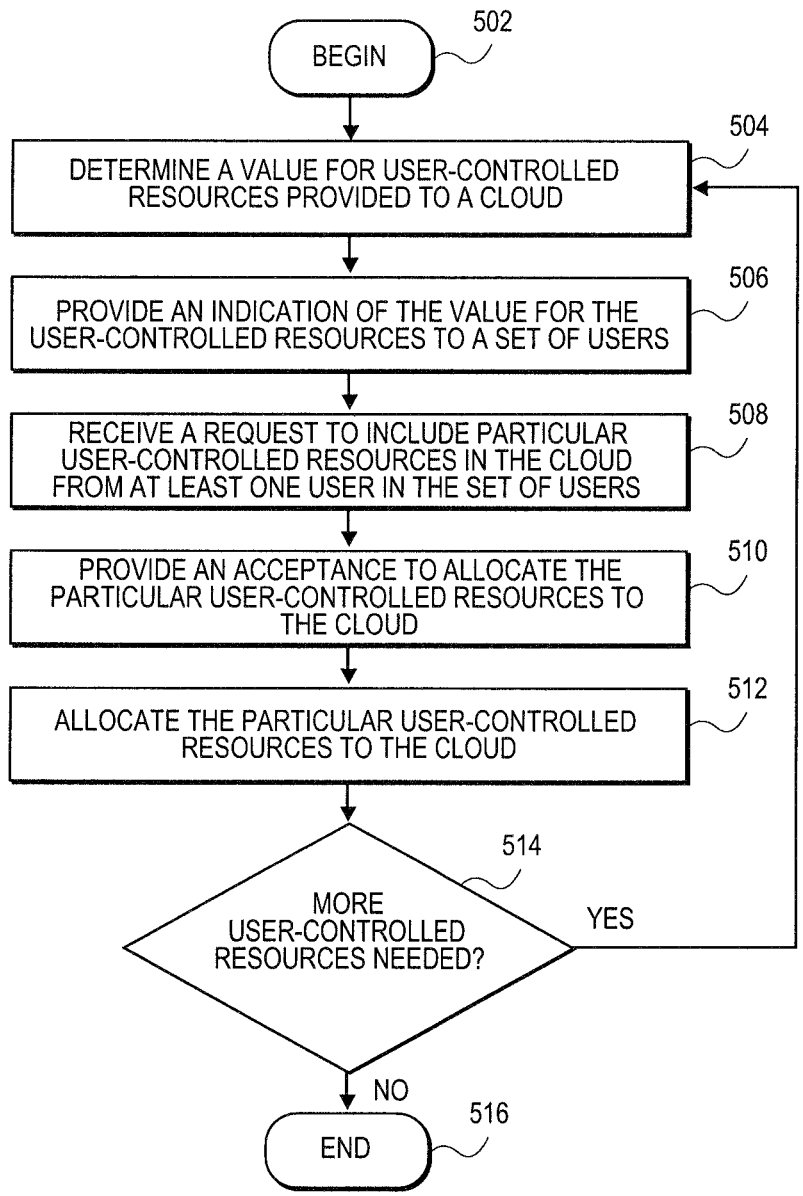
FIG. 5 illustrates a flowchart for valuating and utilizing user-controlled resources, according to various embodiments.

FIG. 5 illustrates a flow diagram of valuation and allocation of user-controlled resources in a cloud computing environment, according to embodiments. In 502, processing can begin. In 504, the cloud management system 200 can determine a value for user-controlled resources provided to a cloud. For example, the valuation engine 220 can be configured to determine a value for user-controlled resources from third parties. The valuation engine 220 can be configured to determine the value for user-controlled resources based on a number of factors such as usage of the pool of resources 215, estimated demand on the pool of resources 215, revenue generated by the pool of resources 215, and the like.

In 506, the cloud management system 200 can provide an indication of the value for the user-controlled resources to a set of users. For example, the valuation engine 220 can be configured to provide an indication 222 of the value of the user-controlled resources to be provided to the cloud 102 to third parties, such as a third party user-controlled resources 205 via network 210. The valuation engine 220 can be configured to provide the indication utilizing any type of communication, such as email, web page, text message, and the like. For example, the valuation engine 220 can be configured to generate and populate a web site with the value for different resources provide to the cloud 102.

In 508, the cloud management system 200 can receive a request to include particular user-controlled resources, such as user-controlled resources 205, in the cloud from at least one user in the set of the users. The request to offer the user-controlled resources 205 can include the specifications of the particular user-controlled resources 205 provided and the duration for the resources to be provided. For example, the request can include an amount of memory to allocate to the cloud, an amount of computing cycles to allocate to the cloud, an amount of communications bandwidth to allocate to the cloud, an amount of storage to allocate to the cloud, and software resources to allocate to the cloud.

In 510, the cloud management system 200 can provide an acceptance to allocate the particular user-controlled resources to the cloud. For example, the valuation engine 220 can be configured to determine the particular value of the user-controlled resources 205 offered. The valuation engine 220 can be configured to apply the previously determined value to the specifications of the particular user-controlled resources 205 provided. Once the particular value of the offered user-controlled resources 205 is determined, the cloud management system 200 can be configured to return the particular value to the user-controlled resources 205 as a service level agreement for the offered user-controlled resources 205.

In 512, the cloud management system 200 can allocate the particular user-controlled resources to the cloud. For example, the cloud management system 200 can communicate with a cloud application 225 or directly allocate and access the user controlled resources.

In 514, the cloud management system 200 can determine if additional user controlled resources are need. If so, the cloud management system 200 can re-value the user-controlled resources, if necessary, by returning to 504. If no other user-controlled resources are needed, in 520, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   determining, by a processing device, a general value for a first-resource to be associated with a pool of resources in view of at least one of: a current usage of the pool of resources by a first plurality of virtual machines, or an estimated change in the current usage of the pool of resources by the first plurality of virtual machines;
   providing an indication of the general value for the first resource to a first computer system;
   receiving, from the first computer system, a response to the indication, wherein the response comprises a request to offer, within the pool of resources, an identified resource local to the first computer system, wherein the request to offer comprises information corresponding to the identified resource;
   determining a revised value for the identified resource in view of the information corresponding to the identified resource and the general value;
   providing a first offer to the first computer system, wherein the first offer comprises a service level agreement (SLA) comprising the revised value offered in exchange for making the identified resource available for addition to the pool of resources;
   adding the identified resource to the pool of resources in response to receiving an acceptance of the SLA;
   receiving, from a second computer system, a request to instantiate a second virtual machine, wherein the request to instantiate the second virtual machine comprises a plurality of parameters defining an operation of the second virtual machine to be invoked;
   selecting, from the pool of resources, a set of resources in view of the plurality of parameters;
   instantiating the second virtual machine using the selected set of resources; and
   tracking the selected set of resources to manage the second virtual machine.

2. The method of claim 1, wherein the general value for the first resource comprises at least one of: a value for an amount of memory provided to the pool of resources, a value for an amount of computing cycles provided to the pool of resources, a value for an amount of communications bandwidth provided to the pool of resources, a value for an amount of storage provided to the pool of resources, or a value for a software resource provided to the pool of resources.

3. The method of claim 1, wherein the general value for the first-resource is provided to a set of users via a user interface.

4. The method of claim 1, further comprising receiving a second request to offer a second identified resource within the pool of resources.

5. The method of claim 4, further comprising determining a value for the second identified resource.

6. The method of claim 5, further comprising determining the value for the second resource in view of at least one of the current usage of the pool of resources or the estimated change in the current usage of the pool of resources.

7. The method of claim 1, wherein the general value for the first-resource is further determined in view of a revenue generated by the current usage of the pool of resources by the first plurality of virtual machines.

8. A system comprising:
   a network interface device; and
   a processing device, operatively coupled to the network interface device, to:
      determine a general value for a first-resource to be associated with a pool of resources in view of at least one of: a current usage of the pool of resources by a first plurality of virtual machines, or an estimated change in the current usage of the pool of resources by the first plurality of virtual machines;
      provide an indication of the general value for the first resource to a first computer system;
      receive, from the first computer system, a response to the indication, wherein the response comprises a request to offer, within the pool of resources, an identified resource local to the first computer system, wherein the request to offer comprises information corresponding to the identified resource;
      determine a revised value for the identified resource in view of the information corresponding to the identified resource and the general value;
      provide a first offer to the first computer system, via the network interface device, wherein the first offer comprises a service level agreement (SLA) comprising the revised value offered in exchange for making the identified resource available for addition to the pool of resources;
      add the identified resource to the pool of resources in response to receiving an acceptance of the SLA;
      receive, from a second computer system, a request to instantiate a second virtual machine, wherein the request to instantiate the second virtual machine comprises a plurality of parameters defining an operation of the second virtual machine to be invoked;

select, from the pool of resources, a set of resources in view of the plurality of parameters;

instantiate the second virtual machine using the selected set of resources; and track the selected set of resources to manage the second virtual machine.

9. The system of claim 8, wherein the general value for the first resource comprises at least one of: a value for an amount of memory provided to the pool of resources, a value for an amount of computing cycles provided to the pool of resources, a value for an amount of communications bandwidth provided to the pool of resources, a value for an amount of storage provided to the pool of resources, or a value for a software resource provided to the pool of resources.

10. The system of claim 8, wherein the general value for the first-resource is provided to a set of users via a user interface.

11. The system of claim 8, wherein the processing device is further to receive, via the network interface device, a second request to offer a second identified resource within the pool of resources.

12. The system of claim 11, wherein the processing device is further to determine a value for the second identified resource.

13. The system of claim 12, wherein the processing device is further to determine the value for the second resource in view of at least one of: the current usage of the pool of resources, or the estimated change in the current usage of the pool of resources.

14. The system of claim 8, wherein the general value for the first-resource is further determined in view of a revenue generated by the current usage of the pool of resources by the first plurality of virtual machines.

15. A non-transitory computer readable storage medium comprising instructions to cause a processing device to:

determine, by the processing device, a general value for a first-resource to be associated with a pool of resources in view of at least one of: a current usage of the pool of resources by a first plurality of virtual machines, or an estimated change in the current usage of the pool of resources by the first plurality of virtual machines;

provide an indication of the general value for the first resource to a first computer system;

receive, from the first computer system, a response to the indication, wherein the response comprises a request to offer, within the pool of resources, an identified resource local to the first computer system, wherein the request to offer comprises information corresponding to the identified resource;

determine a revised value for the identified resource in view of the information corresponding to the identified resource and the general value;

provide a first offer to the first computer system, wherein the first offer comprises a service level agreement (SLA) comprising the revised value offered in exchange for making the identified resource available for addition to the pool of resources;

add the identified resource to the pool of resources in response to receiving an acceptance of the SLA;

receive, from a second computer system, a request to instantiate a second virtual machine, wherein the request to instantiate the second virtual machine comprises a plurality of parameters defining an operation of the second virtual machine to be invoked;

select, from the pool of resources, a set of resources in view of the plurality of parameters;

instantiate the second virtual machine using the selected set of resources; and track the selected set of resources to manage the second virtual machine.

16. The non-transitory computer readable storage medium of claim 15, wherein the general value for the first resource comprises at least one of: a value for an amount of memory provided to the pool of resources, a value for an amount of computing cycles provided to the pool of resources, a value for an amount of communications bandwidth provided to the pool of resources, a value for an amount of storage provided to the pool of resources, or a value for a software resource provided to the pool of resources.

17. The non-transitory computer readable storage medium of claim 15, wherein the general value for the first-resource is provided to a set of users.

18. The non-transitory computer readable storage medium of claim 15, wherein the processing device is further to receive a second request to offer a second identified resource within the pool of resources.

19. The non-transitory computer readable storage medium of claim 18, wherein the processing device is further to determine a value for the second identified resource.

20. The non-transitory computer readable storage medium of claim 19, the processing device further to:

determine the value for the second resource in view of at least one of: the current usage of the pool of resources, or the estimated change in the current usage of the pool of resources.

21. The non-transitory computer readable storage medium of claim 15, wherein the general value for the first-resource is further determined in view of a revenue generated by the current usage of the pool of resources by the first plurality of virtual machines.

* * * * *